July 17, 1923.
E. O. FELLROTH
MACHINE FOR CUTTING TIRES INTO TRANSVERSE SECTIONS
Filed March 7, 1922  2 Sheets-Sheet 2
1,462,197
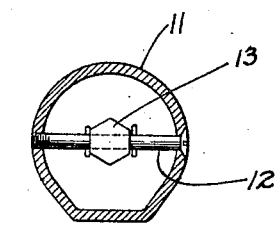
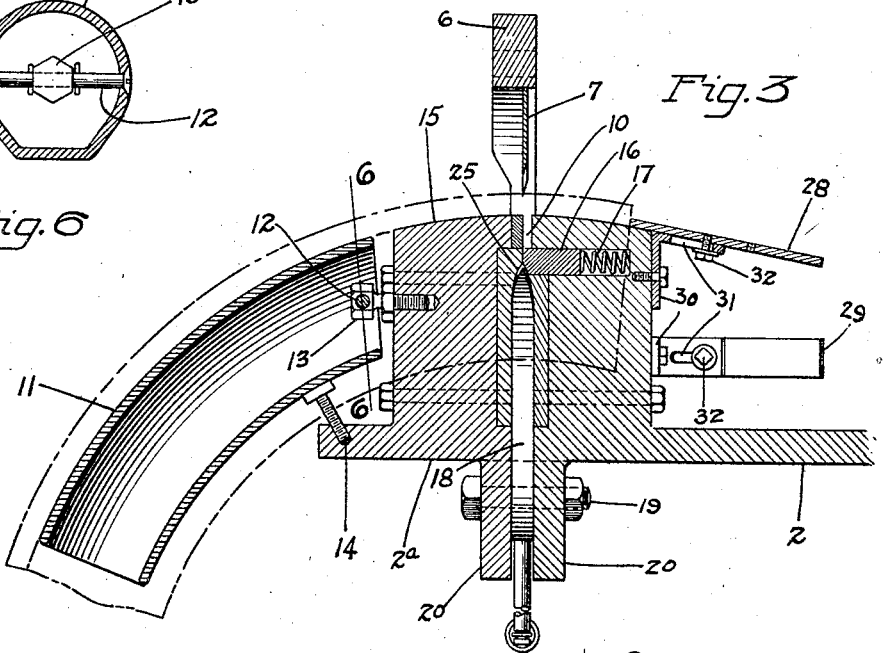
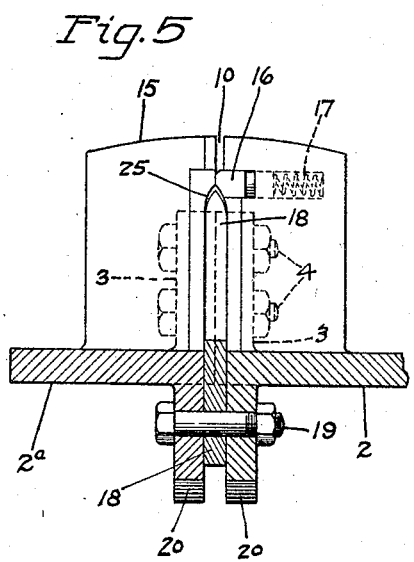
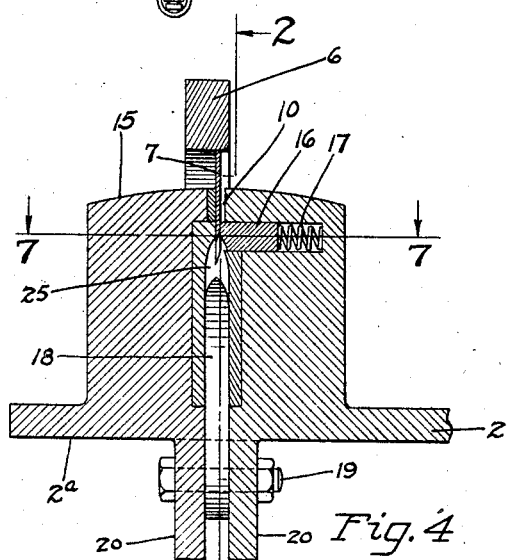
Inventor
ERICK O. FELLROTH
By Paul & Paul
ATTORNEYS Patented July 17, 1923.

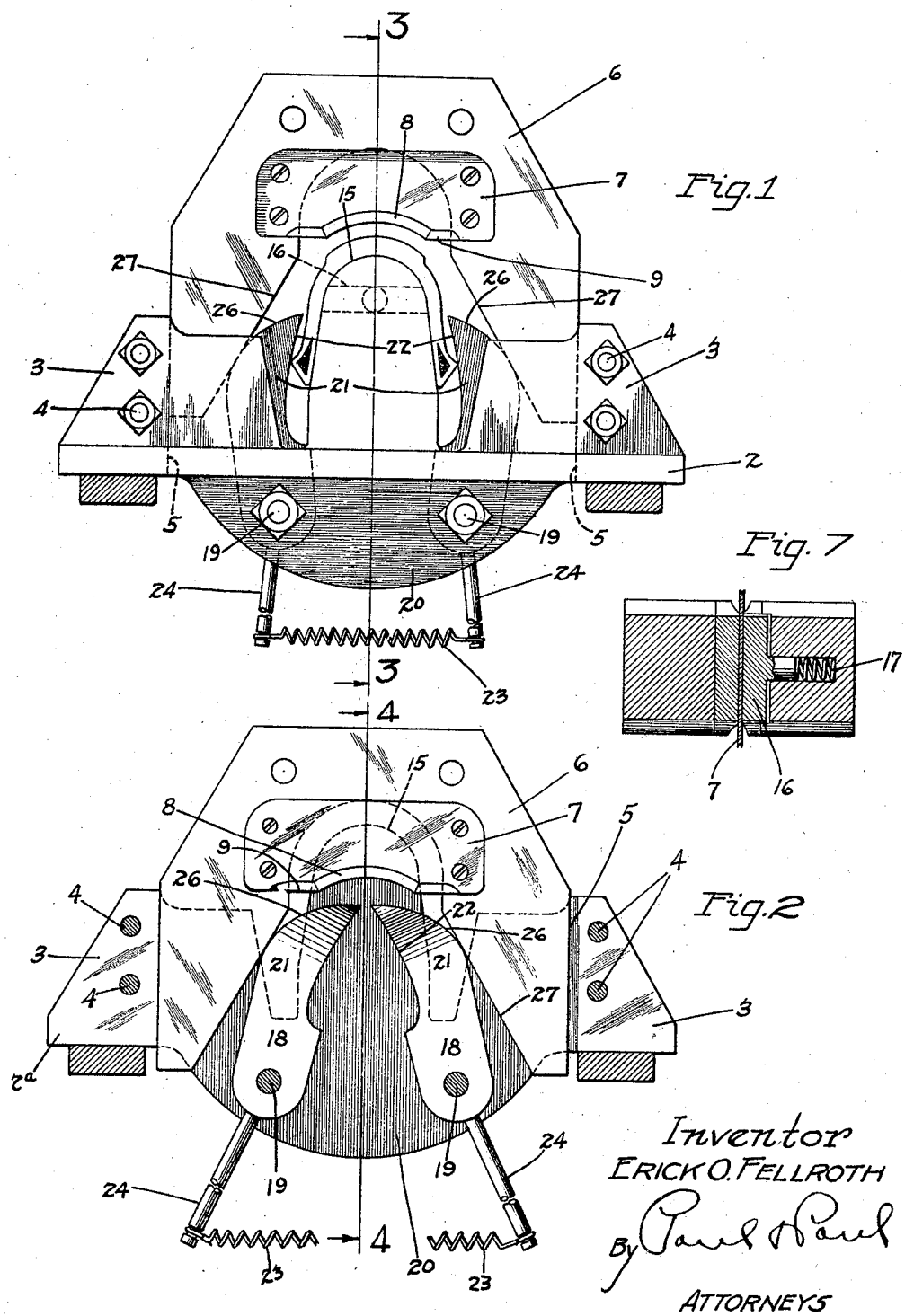

1,462,197

UNITED STATES PATENT OFFICE.

ERICK O. FELLROTH, OF MINNEAPOLIS, MINNESOTA, ASSIGNOR OF ONE-THIRD TO FREDERICK N. HEGG AND ONE-THIRD TO CARL I. LINDSKOOG, BOTH OF MINNEAPOLIS, MINNESOTA.

MACHINE FOR CUTTING TIRES INTO TRANSVERSE SECTIONS.

Application filed March 7, 1922. Serial No. 541,800.

*To all whom it may concern:*

Be it known that I, ERICK O. FELLROTH, a citizen of the United States, resident of Minneapolis, county of Hennepin, State of Minnesota, have invented certain new and useful Improvements in Machines for Cutting Tires into Transverse Sections, of which the following is a specification.

The object of my invention is to provide a machine by means of which a tire shoe, usually worn or second-hand, can be easily and quickly cut into transverse sections or strips, to be flexibly jointed together at the ends to form a guard or protector for a tire in use.

A further object is to provide a cutting means that is adapted for severing a tire in which metallic reinforcing means, such as wires, are embedded in beads of the tire, and must necessarily be cut to sever the tire into transverse sections.

The invention consists generally in various constructions and combinations, all as hereinafter described and particularly pointed out in the claims.

In the accompanying drawings forming part of this specification,

Figure 1 is a perspective view of the rear side of a tire cutting machine, embodying my invention, Figure 2 is a sectional view on the line 2—2 of Figure 3, Figure 3 is a sectional view on the line 3—3 of Figure 1, Figure 4 is a sectional view on the line 4—4 of Figure 2, Figure 5 is a sectional view on the line 5—5 of Figure 1, Figure 6 is a sectional view on the line 6—6 of Figure 3, Figure 7 is a sectional view on the line 7—7 of Figure 4, In the drawings, 2 and 2ª represent the sections of a suitable base arranged in opposing relation and having webs 3 on each side secured together by suitable means, such as bolts 4. These webs have vertical guideways 5 for a knife carrier plate 6 to slide between them. In this carrier a knife blade 7 is mounted by suitable means and provided with a concave cutting edge 8 formed in its middle portion to cut the tread of the tire, the middle portion merging into substantially straight end portions 9 which have the function of cutting the side walls of the tire as the knife descends. An opening 10 is provided between the sections of the base to receive the cutting edge of the knife. One of the base sections is provided on one side with a curved sleeve section 11 conforming substantially to the inner surface of the tire and on which the tire is placed, preparatory to the cutting operation. This sleeve section has a cross pin 12 at one end and a bolt 13 is pivoted thereon and tapped into one of the base sections for supporting the sleeve thereon. A screw 14 is also mounted in one of the base sections and forms a seat for the under side of the sleeve section, the adjustment of this screw regulating the angle or pitch of the sleeve. Base sections are provided with a curved upper surface 15 which forms a continuation of the surface of the sleeve 11 and on this curved surface the end of the tire to be severed is placed bridging the gap or opening 10 so that when the knife descends the desired transverse section of the tire may be severed. The knife carrier 6 may be operated by any suitable mechanism preferably the moving head of a press, not shown, to which the carrier is attached by suitable means.

To provide for a clean cut of the knife through the tire I prefer to mount a block 16 in one of the jaws on one side of the slot 10 and in the rear of said block I provide a compression spring 17 which will have the function of holding the block forwardly with a yielding pressure, permitting it, however, to be pressed back when the knife is performing the cutting operation, thus insuring a clean cut edge.

To limit the feed of the tire and provide for uniform dimensions of the transversely cut sections I provide stops consisting of plates 28 and 29 adjustably mounted in brackets 30 by means of slots 31 and set screws 32. By loosening these screws the stop plates can be moved towards or from the tire, engaging the end thereof and positively limit the feed.

In a machine of this type, when it is desired to cut tires having reinforced beads, it is necessary to provide some adjunct to the main cutting knife for the purpose of making a clean cut of these wires at the same time the tire is severed.

With end in view, I provide supplemental cutting knives 18 pivoted at 19 in depending flanges 20 and having jaws 21 with curved cutting edges 22 which are normally held apart by a spring 23 connecting depending pins 24 mounted in the lower ends of the cutting knives. A recess 25 is formed in the jaws in which the knives 18 oscillate and each knife has a curved edge 26 in the path of a cam 27 on the knife carrier 6, so that when this knife carrier has descended to a certain point it will positively contact with the edges 26 of the knives 18 and force their cutting edges into engagement with the tire bead and sever the bead and the wires therein, making a clean, smooth cut therethrough, which will merge into the cut of the descending knife and co-operate therewith to completely sever the transverse sections of the tire.

I claim as my invention:

1. A tire cutting machine comprising a base having a seat for the tire to be cut transversely, a severing knife mounted to cut the tire tread and knives actuated at a predetermined point in the severing operation for cutting transversely through the tire beads and the metallic reinforcing therein.

2. A tire cutting machine comprising a base having a seat thereon for the tire to be transversely severed, a knife movable in said base and having a cutting edge for severing the tread of the tire transversely, and knives mounted in the path of said severing knife to be engaged thereby at a predetermined point in its stroke for severing the tire beads and the metal reinforcing therein.

3. A machine for cutting tires into transverse sections comprising a base having a seat to enter and support the portion of the tire to be severed, a knife for cutting the tread of the tire transversely, knives provided upon opposite sides of the tire adjacent the beads, and having cutting edges for severing the beads, said knives being pivotally supported and means for pressing them toward each other to cut the beads and the reinforcing means therein.

4. A machine for cutting a tire into transverse sections comprising a base provided with a seat for the tire to be severed, a tread severing means, and means becoming operative at a predetermined point in the movement of the tread severing means for severing the tire beads transversely.

5. A machine for cutting a tire into transverse sections comprising a base provided with a seat for the tire to be severed, a tread severing means, and means becoming operative at a predetermined point in the movement of the tread severing means for severing the tire beads transversely, said bead severing means being pivotally supported at the lower ends and having a positive inward movement during the severing operation.

6. A machine for cutting tires into transverse sections comprising a base having a seat for the tire to be severed, a tread cutting knife and support therefor having cam surfaces, severing means mounted to engage and sever the tire beads, said bead severing means having surfaces in the path of the cam surfaces of said knife to be actuated thereby.

7. A machine for cutting tires into transverse sections comprising a base, a seat thereon for the tire to be severed, a knife support movable in guides in said base, a knife blade carried by said support for severing the tread of the tire transversely, and means actuated at a predetermined point in the movement of said knife support for severing the tire beads transversely and the reinforcing means therein.

8. A machine for cutting tires into transverse sections comprising a base having a tire seat thereon, a sleeve adjustably mounted on said base and adapted to enter the tire and means for severing the tire tread and beads.

9. A machine for cutting tires into transverse sections comprising a base having a seat thereon for the tire to be severed, means for cutting the tread of the tire transversely, knives pivoted at their lower ends in said base and projecting upwardly on each side of said seat and the tire beads, said knives having shearing cutting edges for severing the beads and the metallic reinforcing means therein, and means for forcing said knives toward each other, for the purpose specified.

10. A machine of the class described comprising a base having a seat for a tire to be severed, a knife carrier mounted to move vertically in said base, a knife carried thereby for severing the tread of the tire transversely, said carrier having cam surfaces thereon, blades pivoted in said base and having cutting edges for engaging and severing the beads of the tire, said blades having surfaces in the path of the surfaces on said knife carrier to be actuated thereby.

In witness whereof, I have hereunto set my hand this 28" day of February 1922.

ERICK O. FELLROTH.